United States Patent [19]

Tamai

[11] Patent Number: 5,235,572
[45] Date of Patent: Aug. 10, 1993

[54] OPTICAL DISC ACCESSING APPARATUS

[75] Inventor: Ryo Tamai, Kawasaki, Japan

[73] Assignee: Ricoh Company, Ltd., Tokyo, Japan

[21] Appl. No.: 847,798

[22] Filed: Mar. 6, 1992

[30] Foreign Application Priority Data

Mar. 14, 1991 [JP] Japan .................. 3-074636

[51] Int. Cl.$^5$ .............................................. G11B 17/22
[52] U.S. Cl. .......................................... 369/30; 369/32
[58] Field of Search ................ 369/30, 36, 27, 38,
369/35, 32, 33, 34, 24, 191, 192, 195, 37, 39, 31;
360/133, 73.03, 72.1

[56] References Cited

U.S. PATENT DOCUMENTS 4,787,073 11/1988 Masaki .............................. 369/34 X
4,922,476 5/1990 Kiyoura et al. .................. 369/32 X Primary Examiner—Robert J. Pascal
Assistant Examiner—Ali Neyzari
Attorney, Agent, or Firm—Cooper & Dunham

[57] ABSTRACT

An optical disc accessing apparatus comprises an access request receiving means for receiving a request for access to an optical disc, an accessing subject distinguishing means for judging on whether or not the access request for access is made aiming at the optical disc being accessed when the access request receiving means receives a request for access while an optical disc being accessed, a priority rank determining means for giving a higher priority rank to the request for access which has been judged by the accessing subject distinguishing means as to be made aiming at the optical disc being accessed than the request for access to other optical discs, an access request retaining means for retaining the requests for access based on the order of priority determined by the priority rank determining means and an optical disc accessing means for accessing the optical disc requested to be accessed in accordance with the order of priority of the requests for access retained in the access request retaining means.

18 Claims, 3 Drawing Sheets

OPTICAL DISC ACCESSING APPARATUS

BACKGROUND OF THE INVENTION

1. Field of the Invention

The present invention relates to an optical disc accessing apparatus, and more specifically to an optical disc accessing apparatus for use in an optical disc-electric filing system equipped with juke boxes.

2. Description of the Related Art

There is a wide use of an optical disc since it can hold a great deal of data, and the access to the stored data thereon can be performed at high speed. On the other hand, in the field of electric filing systems etc., with the spread of LAN (local area network), there is usually provided a juke box equipped with a plurality of optical discs and an optical disc driver which is capable of automatically selecting and picking up a required optical disc, or turning over to access a required surface of an engaged optical disc.

In such an electric filing system, there is usually provided a juke box-control unit for controlling requests, transmitted from a plurality of connected search terminals, for access to optical discs in which required information such as image data etc. is being stored.

While one of the search terminals is accessing image information stored in a predetermined optical disc, if this juke box-control unit receives an access request from another search terminal, the juke box-control unit, providing a busy signal which indicates that the juke box is engaged, registers the access request. Subsequently, after completion of the access in progress, the access to the data requested next is to be conducted.

In other word, the access requests are processed in the order of registration in the conventional optical disc accessing apparatus.

FIG. 4 shows a flow of the controlling operation in the juke box-control unit. When a request for access to data stored on an optical disc is made (Step 1;Y), if the juke box is busy or being engaged (Step 2;Y), the optical disc accessing apparatus registers the access request in the queue in the requested order (Step 3), and places the order. Then, by every certain period of time, or when the busy state of the juke box is freed (Step 2;N), the media requested to be accessed are searched in the registered order in the queue (Step 4), to complete the processing.

Meanwhile, when an access to required in formation is conducted on the order of the juke box-control unit, an optical disc driver provided for an elevator in the juke box is to move physically or spatially to the position of the optical disc designated. For this reason, in a conventional juke box-control unit in which access controls are conducted in the requested order, in a case where, for example, there are made requests for access from plural search terminals to data a-1 on the optical disc A, data b on the optical disc B, and data a-2 on the optical disc A in this order; it is necessary to move the optical disc driver along the elevator one by one for each access request, thus giving rise to a problem to prolong the response time. Such problems have occurred not only in the case where access is made to different optical discs in the same juke box, but also the case where a plurality of juke boxes are connected to the system.

SUMMARY OF THE INVENTION

It is therefore an object of the present invention to provide an optical disc accessing apparatus capable of accessing optical discs effectively.

According to the first feature of the invention, the object of the invention can be achieved by an optical disc accessing apparatus comprising:

an access request receiving means for receiving a request for access to an optical disc;

an accessing subject distinguishing means for judging on whether or not the access request for access is made aiming at the optical disc being accessed when the access request receiving means receives a request for access while an optical disc being accessed;

a priority rank determining means for giving a higher priority rank to the request for access which has been judged by the accessing subject distinguishing means as to be made aiming at the optical disc being accessed than the request for access to other optical discs;

an access request retaining means for retaining the requests for access based on the order of priority determined by the priority rank determining means; and an optical disc accessing means for accessing the optical disc requested to be accessed in accordance with the order of priority of the requests for access retained in the access request retaining means.

In relation to the optical disc accessing apparatus stated above as the first feature of the invention, in a case where, for example, during accessing a certain optical disc in the juke box, an access request for the same optical disc is made, the access request is to be retained with being given a higher priority than those of access requests having been kept in the access request retaining means. Consequently, the moving distance of the optical disc accessing means are reduced physically, thus enabling the accessing operation to be conducted effectively.

According to the second feature of the invention, the object of the invention can be achieved by an optical disc accessing apparatus comprising:

an access request receiving means for receiving a request for access to an optical disc;

an distance evaluating means for evaluating the physical distance between the optical disc being accessed and an optical disc requested to be accessed by the request for access when the access request receiving means receives a request for access while an optical disc being accessed;

a priority rank determining means for determining the order of priority of the requests for access in accordance with the distance evaluated by the distance evaluating means;

an access request retaining means for retaining the requests for access requests based on the order of priority of the requests for access determined by the priority rank determining means; and an optical disc accessing means for accessing the optical disc requested to be accessed in accordance with the order of priority retained in the access request retaining means.

In the optical disc accessing apparatus stated above as the second feature of the invention, if the optical disc being requested to be accessed by the latest access request is located physically nearer from the optical disc being accessed in progress than the optical disc being accessed by the access requests kept in the access request retaining means, the latest access request is to be ranked as a higher priority than those of the access requests already retained.

According to the third feature of the present invention, the object of the present invention can be achieved by an optical disc accessing apparatus having the first or second feature, comprising at least one juke box equipped with a plurality of optical discs and controlling both of the juke box and the optical discs. The priority rank determining means comprised in the third feature determines the order of priority for each juke box equipped with a plurality of optical discs.

In the optical disc accessing apparatus stated above as the third feature of the invention, the priority is to be determined for each juke box provided with a plurality of optical discs.

As discussed heretofore, the advantage of the present invention lies in that it is possible to make effective response to requests for access to optical discs.

Further objects and advantages of the present invention will be apparent from the following description of the preferred embodiment of the invention as illustrated in the accompanying drawings.

DESCRIPTION OF THE PREFERRED EMBODIMENTS

Explanation will be made hereinafter on one embodiment of an optical disc accessing apparatus of the present invention with reference to FIG. 1 and FIG. 3.

Figure 1:
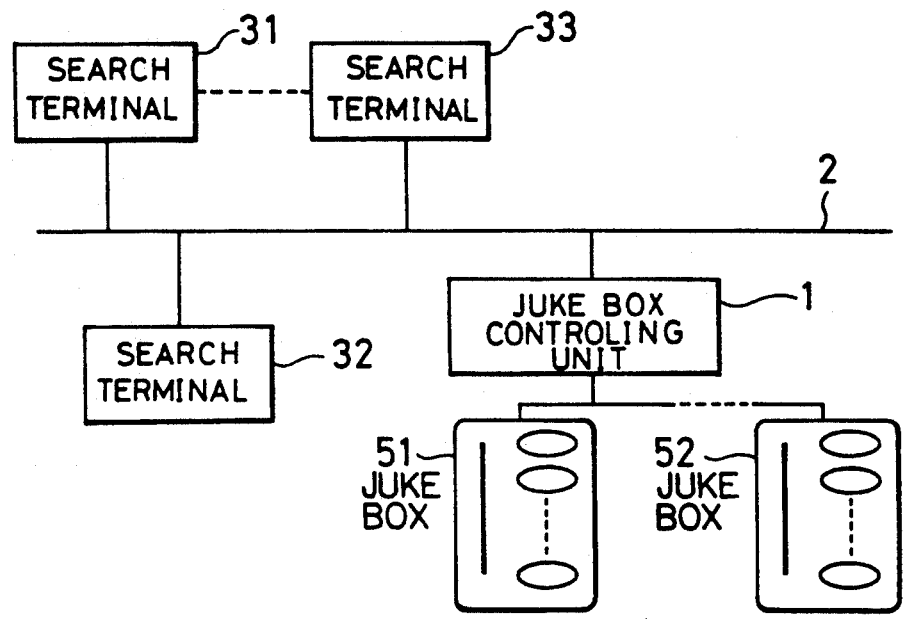
FIG. 1 is a system configuration view showing a system configuration of an embodiment of an optical accessing apparatus according to the present invention.

FIG. 1 shows a configuration of an electric filing system in which an optical disc accessing apparatus is used. This electric filing system is provided with an optical disc controlling unit 1, for taking control of access to optical discs. This optical disc controlling unit 1 is connected to a plurality of search terminals 31, 32, 33, etc through a bus line 2 and is also connected to a plurality of juke boxes 51, 52, etc.

Figure 2:
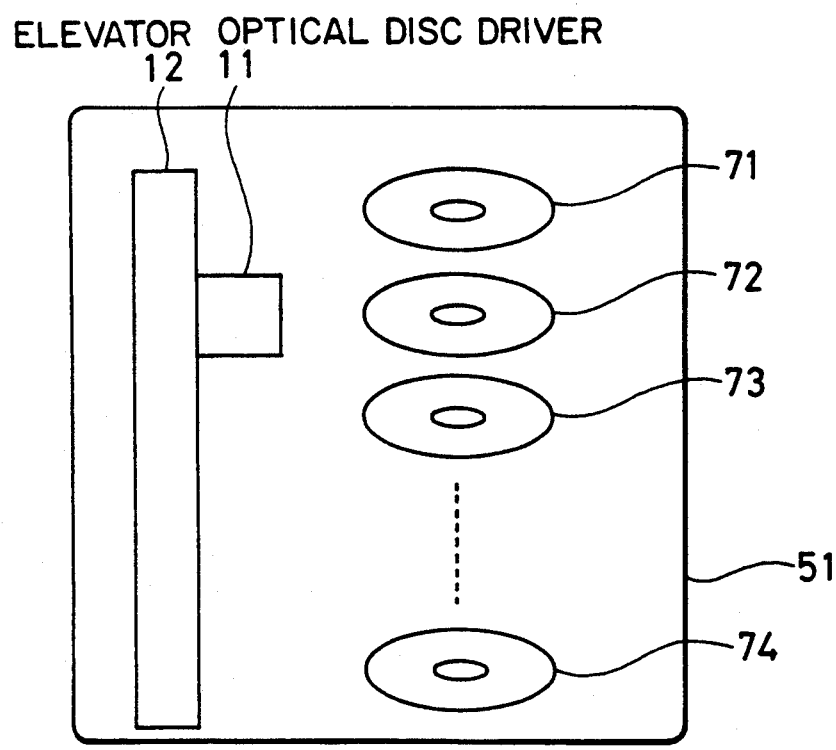
FIG. 2 is a structural view showing a structure of a juke box used in the same embodiment.

FIG. 2 shows a schematic configuration of this juke box. The juke box 51 is provided with a plurality of optical discs 71, 72, 73, 74, etc and an optical disc driver 11 for accessing these optical discs. The optical disc driver 11 is adapted to physically move along an elevator 12 in order to access to a required optical disc.

Figure 3:
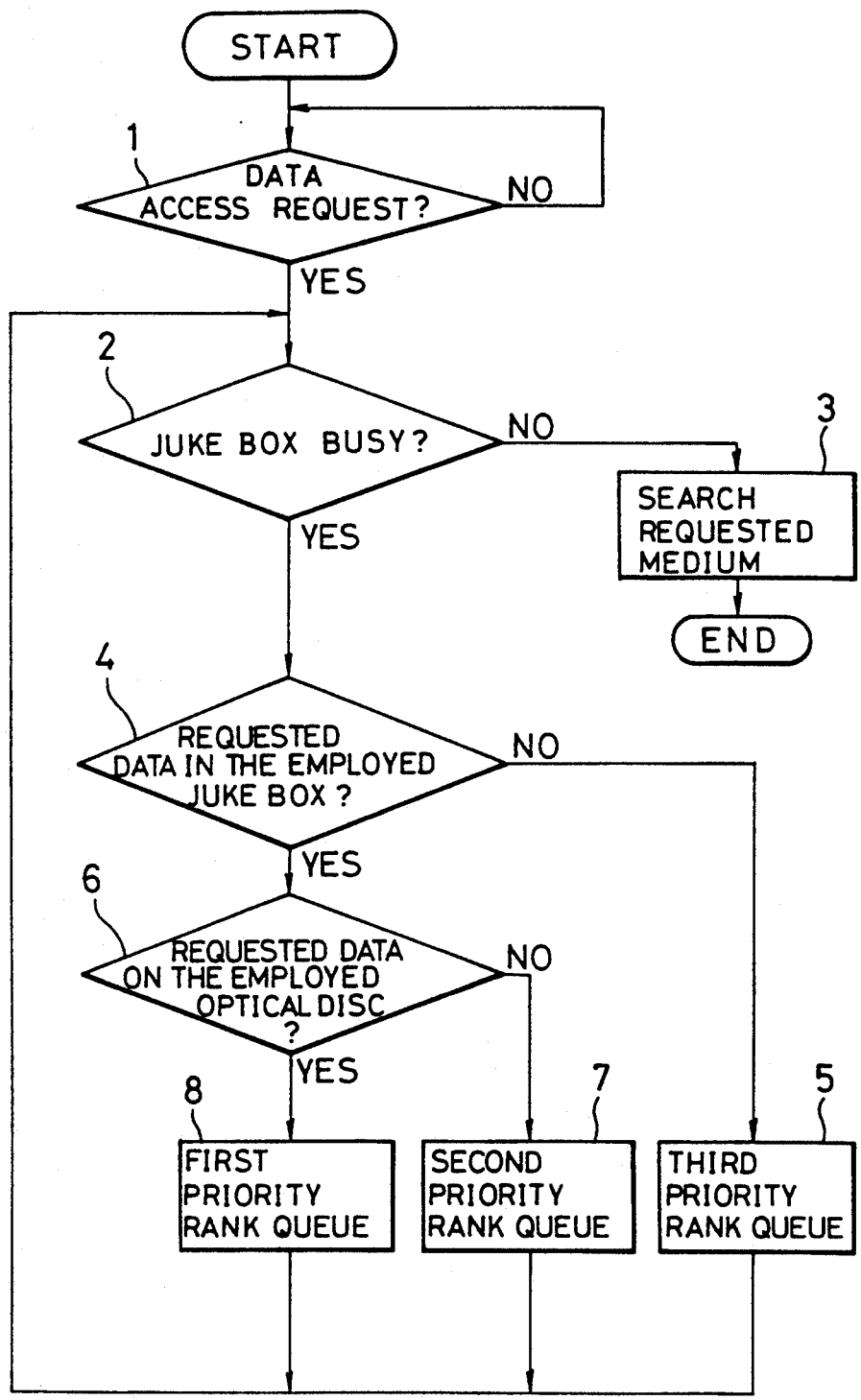
FIG. 3 is a flow chart showing an operation of the optical accessing apparatus of the same embodiment.
Figure 4:
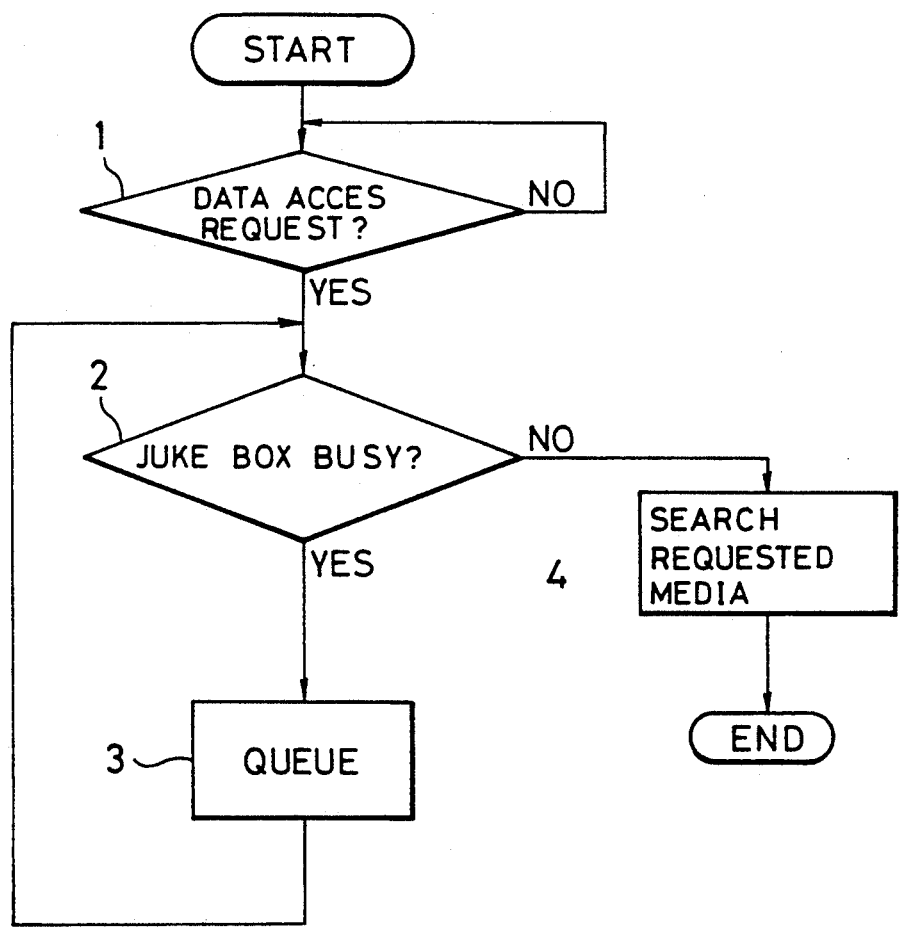
FIG. 4 is a flow chart showing an operation of an optical accessing apparatus conventionally used.

Referring now to FIG. 3, will be made an explanation on the operation of an optical disc accessing apparatus.

The optical disc controlling unit 1 inspects whether there is any request for access to a certain optical disc from any of terminal units (Step 1). When the optical disc controlling unit 1 receives an access request (Step 1;Y), if the juke box is not in operation or busy (Step 2;N), the search for a requested medium stored on a requested optical disc is made (Step 3), to thereby complete the processing.

On the other hand, when the juke box is busy (Step 2;Y), the optical disc controlling unit 1 determines the position of the requested data designated by the access request, gives the order of priority and retains the data (Steps 4 to 8). More specifically, made is a judgment on whether or not the requested data exists in the juke box being engaged at present (Step 4), if the requested data does not exist in the juke box being engaged (N), the access request is retained in the third ranking queue as the lowest priority request (Step 5) for waiting.

In a case where the request data is in the same juke box (Step 4;Y), made is a judgment on whether or not the requested data is on the optical disc which is being read out (Step 6). If the requested data does not exist on the same optical disc being read out (Step 6;N), the access request is retained in the second ranking queue as the second ranking priority request (Step 7) for waiting. On the other hand, the requested data is on the same optical disc being employed (Step 6;Y), the access request is retained in the first ranking queue as the first ranking priority (Step 8) for waiting. At the steps 5, 7 and 8, if there exist two or more access requests at the same priority ranking queue, the access requests are retained in accordance with the requested order.

Subsequently, by every certain period of time, or when the juke box becomes freed from the busy state (Step 2;N), the requested medium to be accessed is searched from the first priority ranking queue, sequentially in the registered order, to the third ranking queue (Step 3), to thereby complete the processing. Thus, the order of the access requests are rearranged by classifying the requests based on priorities into three ranks, i.e., the first, the second and the third ranks, and consequently, it is possible to markedly reduce the loss of response time taken for physical movement for accessing.

In the embodiment detailed above, in the case where requested data does not exist on the optical disc which is being accessed, such access requests are retained in the second priority ranking queue sequentially in their requested order. However, as modification, it is also possible to give a higher priority to a request for access to the optical disc physically closer to the optical disc which is being accessed.

Many widely different embodiments of the present invention may be constructed without departing from the spirit and scope of the present invention. It should be understood that the present invention is not limited to the specific embodiment described in the specification, except as defined in the appended claims.

What is claimed is:

1. An optical disc accessing apparatus comprising:
   an access request receiving means for receiving requests for access to a plurality of optical discs;
   an accessing subject distinguishing means for receiving each of said requests and determining whether a received request is for access to an optical disc being accessed when said request is received or is for access to other ones of said plurality of optical discs;
   a priority rank determining means for giving a higher priority rank to requests for access which have been determined by said accessing subject distinguishing means to be for access to an optical disc being accessed than to the requests for access which have been determined by said accessing subject distinguishing means to be requests for access to other optical discs;
   an access request retaining means for retaining the requests for access based on the order of priority given to the requests by said priority rank determining means; and an optical disc accessing means for accessing the optical discs requested to be accessed in accordance with the order of priority of the requests for access retained in said access request retaining means.

2. An optical disc accessing apparatus according to claim 1 which further comprises at least one juke box equipped with means for holding and accessing a plurality of optical discs.

3. An optical disc accessing apparatus according to claim 2, wherein said optical disc accessing means is adapted to move along an elevator.

4. An optical disc accessing apparatus comprising:
an access request receiving means for receiving requests for access to a plurality of optical discs;
a distance evaluating means for evaluating, for each of said requests, the distance between an optical disc being accessed when the request for access is received by said access request receiving means and the optical disc requested to be accessed by the request for access;
a priority rank determining means for determining the order of priority of the requests for access in accordance with the distance evaluated by said distance evaluating means;
an access request retaining means for retaining the requests for access based on the order of priority of the requests for access determined by said priority rank determining means; and
an optical disc accessing means for accessing the optical discs requested to be accessed in accordance with the order of priority of the requests for access retained in said access request retaining means.

5. An optical disc accessing apparatus according to claim 4 which further comprises at least one juke box equipped with means for holding and accessing a plurality of optical discs.

6. An optical disc accessing apparatus according to claim 5, wherein said optical disc accessing means is adapted to move along an elevator.

7. An optical disc accessing apparatus according to claim 2, which further comprises a plurality of juke boxes and a control unit for controlling requests for access to said plurality of juke boxes.

8. An optical disc accessing apparatus according to claim 1, including means for transmitting said requests for access from a plurality of terminals in a local area network.

9. An optical disc accessing apparatus according to claim 7, wherein said priority rank determining means determines the order of priority for each juke box equipped with means for holding and accessing a plurality of optical discs.

10. An optical disc accessing apparatus according to claim 5, which further comprises a plurality of juke boxes and a control unit for controlling requests for access to said plurality of juke boxes.

11. An optical disc accessing apparatus according to claim 4, including means for transmitting said requests for access from a plurality of terminals in a local area network.

12. An optical disc accessing apparatus according to claim 10, wherein said priority rank determining means determines the order of priority for each juke box equipped with means for holding and accessing a plurality of optical discs.

13. A method for accessing a plurality of optical discs comprising the steps of:
receiving requests for access to said plurality of optical discs;
determining whether a received request is for access to an optical disc being accessed when said request is received or is for access to other ones of said plurality of optical discs;
giving a higher priority rank to requests for access which have been determined to be for access to an optical disc being accessed than to the requests for access which have been determined to be requests for access to other optical discs;
retaining the requests for access based on the order of priority given to the requests by said priority rank determining means; and
accessing the optical discs requested to be accessed in accordance with the order of priority of the requests for access.

14. A method according to claim 13 which further comprises holding and accessing a plurality of optical discs in at least one juke box.

15. A method according to claim 14, further comprising accessing said optical discs by moving an accessing means along an elevator.

16. A method according to claim 14, further comprising holding and accessing a plurality of discs in a plurality of juke boxes and determining the priority of each of said plurality of juke boxes.

17. A method according to claim 13, further comprising the step of transmitting said requests for access from a plurality of terminals in a local area network.

18. A method according to claim 16, further comprising holding and accessing a plurality of discs in a plurality of juke boxes and determining the priority of each of said plurality of juke boxes.

* * * * *